3,558,782
NEMATOCIDAL COMPOSITIONS
Alfred J. Rutkowski, Colonia, N.J., assignor to Esso Research and Engineering Company, a corporation of Delaware
No Drawing. Filed Oct. 10, 1966, Ser. No. 585,315
Int. Cl. A01n 9/00, 9/38
U.S. Cl. 424—291     3 Claims

ABSTRACT OF THE DISCLOSURE

Copper or mercury salts of carboxylic acids, preferably neo-acids, can be successful utilized as nematocides.

---

This invention relates to nematocidal compositions and more particularly concerns the use of salts of carboxylic acids, especially neo acid salts, as nematocides.

During the past fifteen years the use of nematocidal chemicals on many crops has increased rapidly. Recognition of the threat of nematodes to the nations argricultural market has led to the development of the nematocidal chemicals. Without the use of modern nematocides, annual losses are projected to exceed 10% of the production of many of the U.S. crops. Highly susceptible crops would be virtually destroyed under some conditions. Nematodes occur in most soils. They very often become a severe problem when land is brought under intensive cultivation.

Most commercial nematocides are volatile liquids which must be used at high concentrations to get effective activity before evaporation losses are encountered. Many of those which are not volatile liquids are readily leached from the soil by rain and moisture. It has now been discovered that the copper and mercury salts of carboxylic acids are effective, long-lasting nematocides. Such salts are water insoluble and therefore remain in the soil to provide long-lasting effectiveness.

The acids which are suitable for preparing the salts of this invention include $C_2$–$C_{20}$, preferably $C_5$–$C_{15}$, mono- and polycarboxylic acids. The acids may be aliphatic, alicyclic or aromatic. Moreover, the acids may have straight chains or branched chains. The acids may be saturated, for example palmitic or stearic acid or they may be unsaturated. The unsaturated acids are those which contain 1 (e.g. oleic), 2 (e.g. linoleic) or 3 (e.g. linolenic) double bonds. Examples of suitable acids include acetic, furmaric, maleic, malonic, sebacic, adipic, lauric, myristic, palmitoleic, elaidic, eleostearic, licanic, resinoleic, vaccenic and punicic, these acids may be substituted or unsubstituted but it is generally preferred that they be unsubstituted. However, suitable substituents include alkoxy, halogen, amino, hydroxyl, mercapto and nitrile groups.

The acids which are preferred for making the salts of this invention are the $C_5$–$C_{20}$ neo acids. Neo acids are sterically hindered trialkyl acetic acids. The most preferred acids are monocarboxylic neo acids having the following formula:

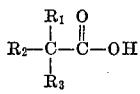

wherein $R_1$, $R_2$, and $R_3$ have from 1 to 26, preferably from 1 to 11 carbon atoms. $R_1$, $R_2$ and $R_3$ may be aliphatic, alicyclic or aromatic. Moreover, they may be saturated or unsaturated; they may have straight or branched chains and may contain certain substituents; however, it is preferred that they be unsubstituted. Examples of suitable neo acids include trimethylacetic acid, triethylacetic acid, etc.; 2,2-dimethylpentanoic acid, 2,2,-diethylpentanoic acid; 2,ethyl-2-methylbutanoic acid and the like.

The neo acids are prepared by reacting an olefin and carbon monoxide in the presence of an acid catalyst in water. The neo acid therefore contains one carbon atom more than the starting olefin; for example, to prepare trimethylacetic acid (pivalic acid or neopentanoic acid), isobutylene and carbon monoxide are reacted in the presence of an acid catalyst yielding an isobutylene-carbon monoxide-catalyst complex. This complex is reacted with water to yield the crude carboxylic acid which is then purified.

The metal salts of this invention can be prepared using conventional techniques such as the reaction of neutral alkali salts (from alkali hydroxides and the free acids) and metal halides, acetates or sulfates; the reaction of metal oxides in the free acid in a refluxing hydrocarbon solvent; or the direct thermal fusion of the metal oxide and the acid.

The efficacy of the instant invention is illustrated by the following examples:

EXAMPLE 1

Copper neo-pentanoate and copper neo-heptanonate were prepared by reacting copper chloride with sodium neo-pentanoate acid (or sodium trimethyl aceate) acid and also sodium 2,2-dimethyl pentanoate. Soil infested with *Meloidogyne arenaria*, a specie of root-knot nematode, was treated with three concentrations of the aforementioned nematocides. The copper salts were absorbed into vermiculite, mixed into the top two inches of soil in glazed crocks, and watered. After one week, tomato seedlings were transplanted into these crocks. Root-knot development was assayed after 5 weeks. The root-knot index is as follows: 1=no galls, 2=1 to 25% of roots galled, 3=26 to 50% of roots galled, 4=51 to 75% of roots galled, 5=76 to 100% of roots galled.

In Table I the aforementioned salts are compared with a standard nematocide and with a sample that was not treated. It is seen in Table I that the copper salts compared favorably with the standard nematocide even though the standard was applied at a rate equivalent to 250 lbs./acre whereas the copper salts were applied at only 25, 50 and 100 lbs./acre.

TABLE I

| | Root knot index [1] | | |
|---|---|---|---|
| Lbs./acre | 25 | 50 | 100 |
| Compound: | | | |
| Copper neo-pentanoate | 2.7 | 2.3 | 2.0 |
| Copper neo-heptanoate | 2.7 | 3.3 | 2.3 |
| D-D [2] | 3.3 | 3.0 | 1.5 |
| Check (no treatment) | 4.8 | | |

[1] Each figure for root-knot index is the mean of three replicates.
[2] D-D is a standard nematocide and was injected into the soil at a rate equivalent to 250 lbs./acre.

EXAMPLE 2

Copper neo-pentanoate and copper neo-heptanoate were prepared as mentioned in Example 1. Copper neo-decanoate was prepared by reacting a copper salt, cupric sulfate, with sodium neo-decanoate. Sodium neo decanoate was prepared by reacting neo-decanoic acid with sodium hydroxide. Copper neo-tridecanoate was prepared by reacting a copper salt, cupric sulfate, with sodium neo-tridecanoate. Mercury neo pentanoate was prepared by reacting a mercury salt, mercuric acetate, with sodium neo decanoate. Mercury neo heptanoate was prepared by reacting a mercury salt, mercuric acetate with sodium neo-heptanoate. The tests were conducted with the aforementioned nematocides against a specie of panagrellas, an active saporzoic nematode. The nema were collected from the culture medium in a manner to insure their freedom from food contamination and uniformity of age by means of a Baerman funnel technique. The test was carried out in a stoppered tube containing 10 ml. of the candidate chemical, and the nematode population at the time of seeding was adjusted to 50 to 75 per tube. The nematodes in the blank when handled properly, survive at least seven days without the addition of food. Microscopic observations on the behavior of the nema were made daily over a period of five to seven days to establish the rapidity of action and the final end point of kill. The data in Table II indicate that the nematocides of this invention are effective at application rates of only five parts per million.

TABLE II

| Compound | Dose (p.p.m.) | Percent mortality after— | | |
|---|---|---|---|---|
| | | 1 day | 2 days | 4 days |
| Copper neo pentanoate | 500 | 100 | 100 | 100 |
| | 50 | 100 | 100 | 100 |
| | 5 | 100 | 100 | 100 |
| Copper neo heptanoate | 500 | 99 | 100 | 100 |
| | 50 | 100 | 100 | 100 |
| | 5 | 85 | 100 | 100 |
| Copper neo decanoate | 500 | 100 | 100 | 100 |
| | 50 | 100 | 100 | 100 |
| | 5 | 100 | 100 | 100 |
| Copper neo tridecanoate | 500 | 100 | 100 | 100 |
| | 50 | 100 | 100 | 100 |
| | 5 | 50 | 88 | 99 |
| Mercury neo pentanoate | 500 | 100 | 100 | 100 |
| | 50 | 100 | 100 | 100 |
| | 5 | 0 | 80 | 95 |
| Mercury neo heptanoate | 500 | 100 | 100 | 100 |
| | 50 | 99 | 100 | 100 |
| | 5 | 33 | 83 | 97 |

EXAMPLE 3

Additional greenhouse tests were performed with the copper neo pentanoate and copper neo heptanoate of Example 1. The tests were performed on cucumber plants in accordance with the following procedure: Each of the aforementioned salts was dissolved in acetone and mixed with vermiculite. The acetone was allowed to thoroughly evaporate and the vermiculite impregnated with the salt and incorporated into the nematode infested sandy loam soil. The cucumbers were planted on the same day the soil was treated. The following data were obtained after a six-week growing period; the root-knot index is the same as given in Example 1.

TABLE III

| | Root knot index | |
|---|---|---|
| | 25 lbs./acre | 50 lbs./acre |
| Compound: | | |
| Copper neo pentanoate | 1.5 | 1.0 |
| Copper neo heptanoate | 1.0 | 1.0 |
| Check (no treatment) | 4.8 | |

The complete control is remarkable and an overdose was actually suspected. With copper neo-pentanoate, at 50 lbs./acre slight root damage was observed. With copper neo-heptanoate more severe root damage was observed at both rates and lower treatments of active material is indicated.

EXAMPLE 4

Field trials were run on tomato plants with copper salts of neo-pentanoic and neo-heptanoic acids. The following data were obtained which show the remarkable nematocide activity when compared to standard nematocides. Table IV gives the results using copper neo pentanoate and Table V gives the results using copper neo-heptanoate.

TABLE IV.—PREPLANT TREATMENT (¹) OF TOMATO PLOTS WITH COPPER NEO PENTANOATE

Average of 4 Reps.

| | Total nematodes in soil | |
|---|---|---|
| Date | 4/15/65 | 5/20/65 |
| Compound (Dosage): | | |
| Copper neo pentanoate: | | |
| 50 lbs./acre (²) | 24 | 37 |
| 50 lbs./acre (³) | 22 | 28 |
| 100 lbs./acre (²) | 81 | 100 |
| 100 lbs./acre (³) | 12 | 45 |
| Ethylene dibromide (6 gal./acre) (⁴) | 0 | 59 |
| Diazinon: | | |
| 10 gal./acre (³) | 0 | 1 |
| 20 gal./acre | 0 | 5 |
| Check (no treatment) | 21 | 137 |

(¹) Test begun on 3/31/65.
(²) Drenched into soil.
(³) Drenched into soil and raked.
(⁴) Injected into soil.

TABLE V.—PREPLANT TREATMENT (¹) OF TOMATO PLOTS WITH COPPER NEO HEPTANOATE

Average of 4 Reps.

| | Total nematodes in soil | |
|---|---|---|
| Date | 4/15/65 | 5/20/65 |
| Compound (Dosage): | | |
| Copper neo heptanoate: | | |
| 50 lbs./acre (²) | 8 | 16 |
| 50 lbs./acre (³) | 0 | 9 |
| 100 lbs./acre (³) | 0 | 8 |
| Ethylene dibromide (6 gal./acre) (⁴) | 0 | 59 |
| Diazinon: | | |
| 10 gal./acre (³) | 0 | 1 |
| 20 gal./acre | 0 | 5 |
| Check (no treatment) | 21 | 137 |

(¹) Test begun on 3/31/65.
(²) Drenched into soil.
(³) Drenched into soil and raked.
(⁴) Injected into soil.

In carrying out the instant invention any suitable method may be employed for distributing the chemical through the soil. The nematocide may be applied to the soil in the form of a solution in a liquid carrier, as an emulsion in water or as a dispersion in or on a finely divided carrier. Any of the above diluents are suitable. Moreover, undiluted application can be practiced. However, it is not now preferred because it does not permit as great a uniformity of application or the ease of penetration which are obtained with diluents.

Two conventional methods for incorporating solutions and emulsions in the soil which can be used in this invention are the spot injection and the conventional drilling techniques. In the injection operation, a syringe applicator or other suitable device is employed to deliver a major quantity of the active into the soil at spaced intervals. In drilling operations a convenient apparatus consists of an applicator embodying a plurality of steel blades or shanks which are attached. Tubes which are connecting with a reservoir contain the active material in a liquid vehicle. The latter is delivered through the tube or tubes under pressure at a point behind each blade and below the surface of the soil.

Emulsion compositions in which the nematocide is dispersed in water can be applied substantially as described above. In addition, such emulsions can be introduced into irrigation water or applied directly to the surface of the soil preferably followed by roto-tilling.

Nematocides can also be dispersed in and on a solid carrier which is either neutral or acidic in character such as saw dust, talc, diatomaceous earth, carbon, volcanic ash, vermiculite and the like, which is then disked or plowed into or under the surface of the field or strewn into the furrow behind the conventional plow shear and thereafter covered by a succeeding furrow slice.

A preferred method of preparing and applying the metal salt of this invention is to apply an aqueous solution of a copper mercury salt for example, copper sulfate, mercuric chloride, copper acetate or mercuric acetate to the soil and then apply an aqueous solution of a water-soluble salt of the carboxylic acids, for example, sodium neo-heptanoate. By this technique the effective nematocide of this invention is formed in the soil. This technique permits a complete, intimate contact with the soil. Regardless of the form in which the active ingredient is applied to the soil, it should be done with compositions which deposit from 10 to 350 lbs. active ingredient per acre or in certain instances up to 600 lbs. per acre, the exact amount depending upon a variety of factors such as the organisms concerned, temperature of the soil, the moisture content of the soil and the like. For most purposes a dosage of from 10 to 50 lbs. of active ingredient per acre is satisfactory.

What is claimed is:

1. A method for controlling nematodes comprising the step of contacting a nematode-infested environment with a nematocidally effective amount of a copper or mercury salt of neodecanoic acid, said salt being adsorbed onto vermiculite.

2. A method for controlling nematodes comprising the step of contacting a nematode-infested environment with a nematocidally effective amount of a copper or mercury salt of neopentanoic acid, said salt being adsorbed onto vermiculite.

3. A method for controlling nematodes comprising the step of contacting a nematode-infested environment with a nematocidally effective amount of a copper or mercury salt of neoheptanoic acid, said salt being adsorbed onto vermiculite.

References Cited

UNITED STATES PATENTS

| | | | |
|---|---|---|---|
| 2,852,426 | 9/1958 | Stansbury | 167—22 |
| 3,176,033 | 3/1965 | Guyot et al. | 167—22X |
| 3,287,209 | 11/1966 | Simmons et al. | 424—146 |
| 2,846,351 | 8/1958 | Tarjan et al. | 424—317 |

OTHER REFERENCES

Chemical Abstracts, vol. 53; 9041b; 1959.
Chemical Abstracts, vol. 53; 10645h; 1959.
Chemical Abstracts, vol. 55; 20613f; 1961.

ALBERT T. MEYERS, Primary Examiner
L. SCHENKMAN, Assistant Examiner

U.S. Cl. X.R.
424—294, 317